(12) United States Patent
Rajagopal et al.

(10) Patent No.: US 10,050,816 B2
(45) Date of Patent: Aug. 14, 2018

(54) METHOD AND APPARATUS FOR PEAK TO AVERAGE POWER REDUCTION IN WIRELESS COMMUNICATION SYSTEMS USING SPECTRAL MASK FILLING

(71) Applicant: Samsung Electronics Co., Ltd., Suwon-si, Gyeonggi-do (KR)

(72) Inventors: Sridhar Rajagopal, Plano, TX (US); Shadi Abu-Surra, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/675,190

(22) Filed: Mar. 31, 2015

(65) Prior Publication Data

US 2016/0020933 A1  Jan. 21, 2016

Related U.S. Application Data

(60) Provisional application No. 62/026,450, filed on Jul. 18, 2014.

(51) Int. Cl.
*H04L 27/26*  (2006.01)
*H04W 72/04*  (2009.01)
*H04L 27/00*  (2006.01)

(52) U.S. Cl.
CPC .................. *H04L 27/0006* (2013.01)

(58) Field of Classification Search
CPC ............. H04L 27/0006; H04L 27/262; H04W 72/0473; H04W 72/0453
See application file for complete search history.

(56) References Cited

U.S. PATENT DOCUMENTS

2004/0218689 A1* 11/2004 Akhtman ............ H04L 27/2624
375/296
2008/0137767 A1   6/2008 Jaenecke
(Continued)

FOREIGN PATENT DOCUMENTS

CN        101674279 A    3/2010

OTHER PUBLICATIONS

International Search Report and Written Opinion issued for PCT/KR2015/010000 dated Feb. 19, 2016, 7 pgs.
(Continued)

*Primary Examiner* — Alex Skripnikov
*Assistant Examiner* — Pamit Kaur

(57) ABSTRACT

A user equipment, apparatus, and method are provided for wireless communication with at least one base station. The user equipment includes a transceiver configured to communicate with the at least one base station by transmitting radio frequency signals to the at least one base station and by receiving radio frequency signals from the at least one base station. The user equipment also includes processing circuitry. The processing circuitry is configured to identify an occupied signal bandwidth of the radio frequency signals. The processing circuitry is also configured to identify a spectral mask for the occupied signal bandwidth. The processing circuitry is also configured to identify an unused available spectrum between the occupied signal bandwidth and the spectral mask. The processing circuitry is also configured to modulate a spectral mask filling (SMF) signal in the unused available spectrum, the SMF signal configured to reduce the peak-to-average power ratio of the radio frequency signals.

18 Claims, 14 Drawing Sheets

(56) References Cited

U.S. PATENT DOCUMENTS

| | | |
|---|---|---|
| 2011/0110304 A1 | 5/2011 | Kuchi et al. |
| 2011/0235760 A1 | 9/2011 | Yu et al. |
| 2012/0257690 A1 | 10/2012 | Li |
| 2014/0029511 A1 | 1/2014 | Park et al. |
| 2015/0163680 A1* | 6/2015 | Valliappan ............ H04W 16/14 370/329 |

OTHER PUBLICATIONS

Niknejad et al., "Design of CMOS Power Amplifiers", IEEE Transactions on Microwave Theory and Techniques, vol. 60, No. 6, Jun. 2012, pp. 1784-1796.

Li et al., "Effects of Clipping and Filtering on the Performance of OFDM", IEEE Communications Letters, vol. 2, No. 5, May 1998, pp. 131-133.

Yang et al., "PAPR Reduction Using Low Complexity PTS to Construct of OFDM Signals Without Side Information", IEEE Transactions on Broadcasting, vol. 57, No. 2, Jun. 2011, pp. 284-290.

Krongold et al., "PAR Reduction in OFDM via Active Constellation Extension", IEEE Transactions on Broadcasting, vol. 49, No. 3, Sep. 2003, pp. 258-268.

Han et al., "Tone Injection with Hexagonal Constellation for Peak-to-Average Power Ratio Reduction in OFDM", IEEE Communications Letters, vol. 10, No. 9, Sep. 2006, pp. 646-648.

Lim et al., "Near Optimal PRT Set Selection Algorithm for Tone Reservation in OFDM Systems", IEEE Transactions on Broadcasting, vol. 54, No. 3, Sep. 2008, pp. 454-460.

"Digital Video Broadcasting (DVB); Frame structure channel coding and modulation for a second generation digital terrestrial television broadcasting system (DVB-T2)", European Standard (Telecommunications series) ETSI EN 302 755, V1.1.1, Sep. 2009, 167 pages.

"Part 11: Wireless LAN Medium Access Control (MAC) and Physical Layer (PHY) Specifications—Amendment 3: Enhancements for Very High Throughput in the 60 GHz Band", IEEE Standard for Information technology—Telecommunications and information exchange between systems Local and metropolitan area networks—Specific requirements, IEEE Computer Society LAN/MAN Standards Committee, IEEE Std 802.11ad™-2012, 628 pages.

Extended European Search Report regarding Application No. 15887872.8, dated Feb. 22, 2018, 13 pages.

Wang et al., "A Low-Complexity Peak-to-Average Power Ratio Reduction Technique for OFDM-Based Systems", 2004 IEEE 60th Vehicular Technology Conference, Sep. 2004, pp. 4380-4384.

Wu et al., "Effectiveness of Tone-Reservation using Null Subcarriers (TR-NS) in WiMAX Systems", 5th International Conference on Communications, Circuits and Systems, Jul. 2007, pp. 296-300.

Jun et al., "Reduction of the Peak-to-Average Power Ratio of the Multicarrier Signal via Artificial Signals", 2000 International Conference on Communication Technology Proceedings, Aug. 2000, pp. 581-585.

Rajagopal et al., "Power Efficient Signal Processing for mmWave 5G Systems", Journal of Signal Processing Systems, vol. 83, No. 2, Nov. 2015, pp. 177-190.

* cited by examiner

METHOD AND APPARATUS FOR PEAK TO AVERAGE POWER REDUCTION IN WIRELESS COMMUNICATION SYSTEMS USING SPECTRAL MASK FILLING

CROSS-REFERENCE TO RELATED APPLICATION(S) AND CLAIM OF PRIORITY

The present application claims priority to U.S. Provisional Patent Application Ser. No. 62/026,450, filed Jul. 18, 2014, entitled "METHOD AND APPARATUS FOR PEAK TO AVERAGE POWER REDUCTION IN WIRELESS COMMUNICATION SYSTEMS USING SPECTRAL MASK FILLING". The content of the above-identified patent document is incorporated herein by reference.

TECHNICAL FIELD

The present application relates generally to wireless communication systems and, more specifically, to a reducing peak to average power ratios.

BACKGROUND

Orthogonal frequency division multiplexing (OFDM) has been adopted as a standard for various high data rate wireless communication systems due to the spectral bandwidth efficiency, robustness to frequency selective fading channels, etc. However, implementation of the OFDM system entails several difficulties. One of the major drawbacks is the high peak-to-average power ratio, which results in intercarrier interference, high out-of-band radiation, and bit error rate performance degradation, mainly due to the nonlinearity of the high power amplifier. The peak-to-average power ratio is the peak amplitude squared divided by the RMS value squared.

One scheme considered for peak to average power reduction (PAPR) is clipping a signal in the time-domain before amplification. Clipping can reduce PAPR by 2-3 dB but can cause degradation in EVM and cause spectrum growth out-of-band. Other time-domain techniques have been proposed such as partial transmit sequence (PTS) where the signal is partitioned into sub-blocks and each sub-block is multiplied by different phase shifts to minimize the PAPR. The disadvantages of such schemes are the need to partition the transmitter signal, the complexity for searching the optimal phase shifts and the need to send side information (or blind search) at the receiver.

Frequency domain approaches have also been considered in the past such as active constellation expansion (ACE), tone injection (TI) and tone reservation (TR). In ACE and TI, the constellations are adjusted to minimize PAPR such that there is no PER loss and no need for side information at the receiver. However, there is still complexity involved in finding the best constellation points, computing the PAPR in the time-domain and iterating this process. The gains for large QAM modulation are also limited in ACE and TI. In TR, a few tones (5-15%) are reserved to help with PAPR reduction. This leads to spectral efficiency loss.

SUMMARY

An apparatus and method (e.g., mobile station) capable of peak to average power ratio reduction is provided.

In a first embodiment, a user equipment is provided for wireless communication with at least one base station. The user equipment includes a transceiver configured to communicate with the at least one base station by transmitting radio frequency signals to the at least one base station and by receiving radio frequency signals from the at least one base station. The user equipment also includes processing circuitry. The processing circuitry is configured to identify an occupied signal bandwidth of the radio frequency signals. The processing circuitry is also configured to identify a spectral mask for the occupied signal bandwidth. The processing circuitry is also configured to identify an unused available spectrum between the occupied signal bandwidth and the spectral mask. The processing circuitry is also configured to modulate a spectral mask filling (SMF) signal in the unused available spectrum, the SMF signal configured to reduce the peak-to-average power ratio of the radio frequency signals.

In a second embodiment, an apparatus includes a memory element configured to store radio frequency signals. The apparatus also includes a controller coupled to the memory element. The controller is configured to identify an occupied signal bandwidth of the radio frequency signals. The controller is also configured to identify a spectral mask for the occupied signal bandwidth. The controller is also configured to identify an unused available spectrum between the occupied signal bandwidth and the spectral mask. The controller is also configured to modulate a spectral mask filling (SMF) signal in the unused available spectrum, the SMF signal configured to reduce the peak-to-average power ratio of the radio frequency signals.

In a third embodiment, a method is provided for peak to average peak ratio reduction. The method includes identifying an occupied signal bandwidth of the radio frequency signals. The method also includes identifying a spectral mask for the occupied signal bandwidth. The method also includes identifying an unused available spectrum between the occupied signal bandwidth and the spectral mask. The method also includes modulating a spectral mask filling (SMF) signal in the unused available spectrum, the SMF signal configured to reduce the peak-to-average power ratio of the radio frequency signals.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method.

Figure 1:
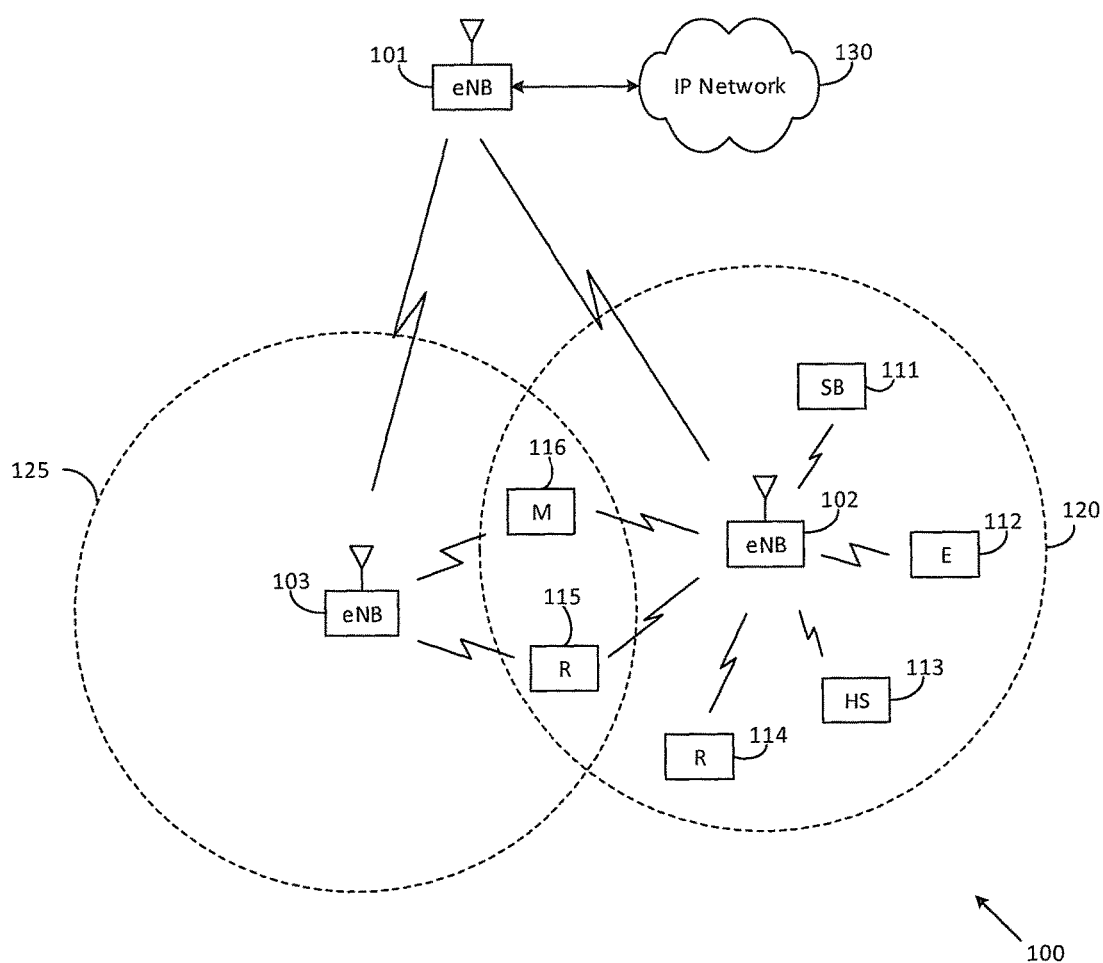
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
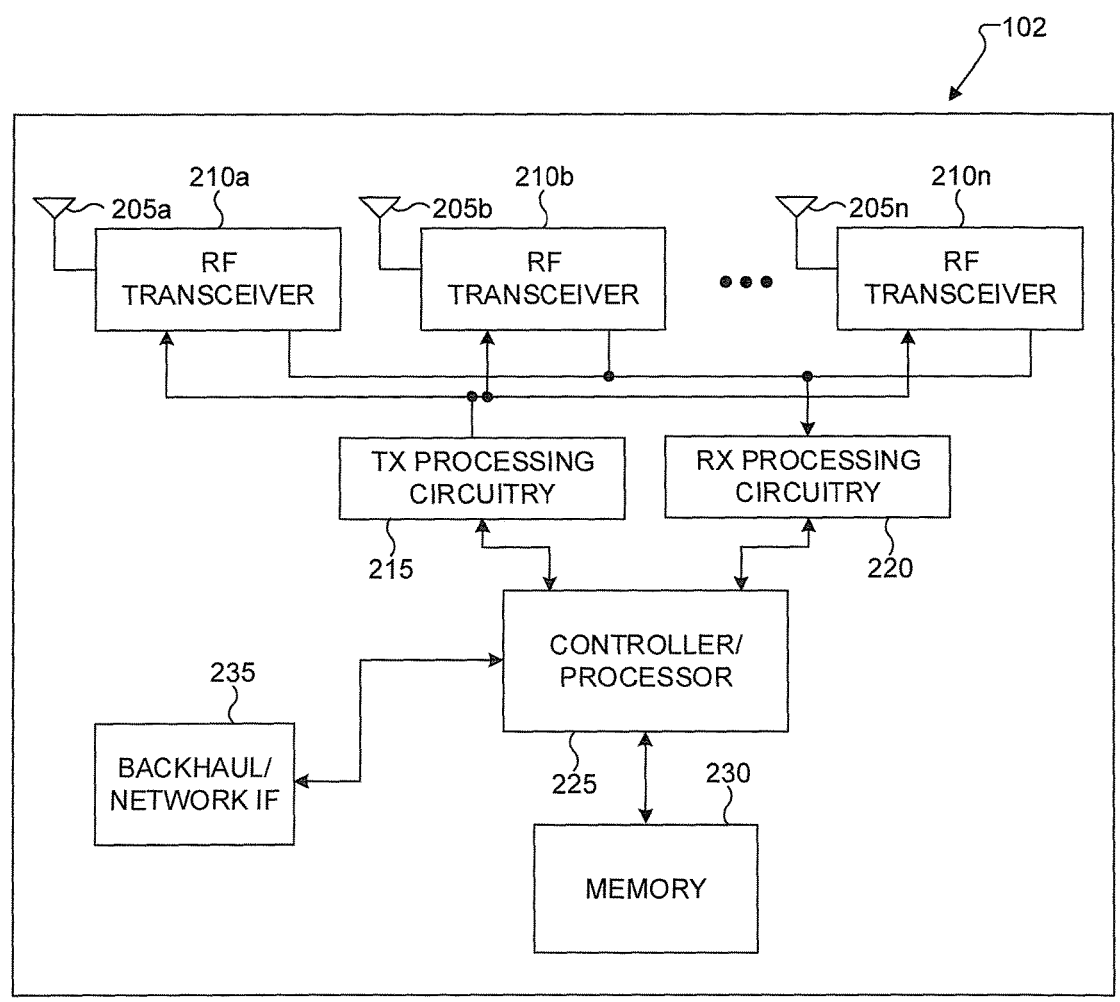
FIG. 2 illustrates an example eNodeB (eNB) according to this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
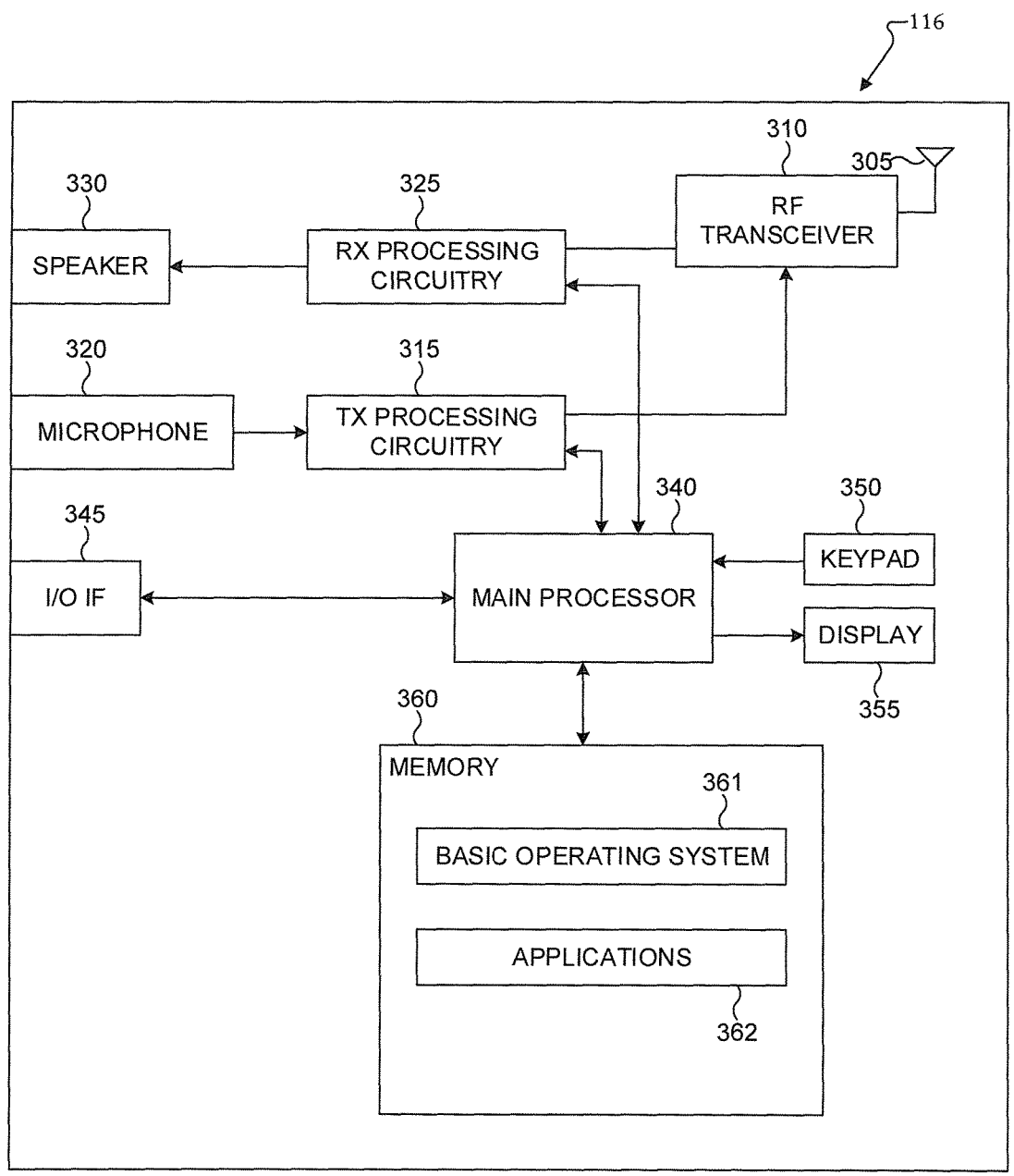
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
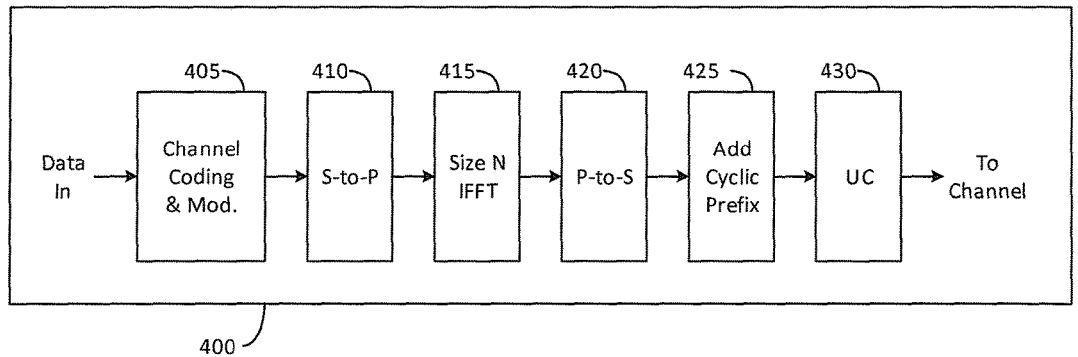
FIGS. 4A and 4B illustrate example wireless transmit and receive paths according to this disclosure.
Figure 4B:
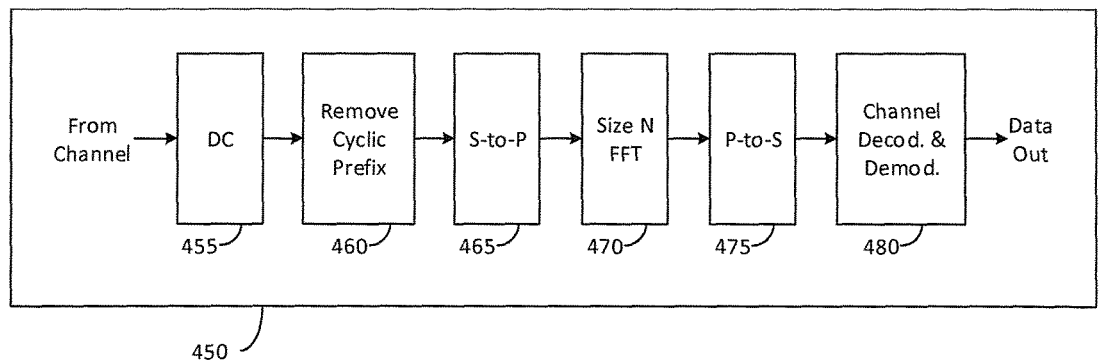

FIGS. 4A and 4B illustrate example wireless transmit and receive paths according to this disclosure. In the following description, a transmit path 400 may be described as being implemented in an eNB (such as eNB 102), while a receive path 450 may be described as being implemented in a UE (such as UE 116). However, it will be understood that the receive path 450 could be implemented in an eNB and that the transmit path 400 could be implemented in a UE. In some embodiments, the transmit path 400 and receive path 450 are configured to insert general description of at least one aspect of invention.

The transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 450 includes a down-converter (DC) 455, a remove cyclic prefix block 460, a serial-to-parallel (S-to-P) block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the eNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 480 demodulates and decodes the modulated symbols to recover the original input data stream.

Each of the eNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to eNBs 101-103 and may implement a receive path 450 for receiving in the downlink from eNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths, various changes may be made to FIGS. 4A and 4B. For example, various components in FIGS. 4A and 4B could be combined, further subdivided, or omitted and additional components could be added according to particular needs. Also, FIGS. 4A and 4B are meant to illustrate examples of the types of transmit and receive paths that could be used in a wireless network. Any other suitable architecture could be used to support wireless communications in a wireless network.

Various embodiments of this disclosure are related to peak to average power reduction (PAPR) of signals to help improve the power amplifier operating efficiency for wireless communication systems. One or more embodiments of this disclosure address the problem of improving the power efficiency of wireless communication devices.

One or more embodiments of this disclosure provides a method to reduce PAPR called spectral mask filling (SMF) by utilizing any available spectrum between the occupied signal bandwidth and the spectral mask. One embodiment provides a feed-forward architecture for real-time processing. Another embodiment provides a reduced complexity architecture that can support real-time, low-latency implementations. The spectral mask filling technique has no impact on EVM or spectral efficiency and does not require any side information to be transmitted to the receiver. The receiver can ignore the SMF addition as it is in the unused spectrum. It is applicable to both OFDM and single-carrier systems.

Signals having high PAPR use significant back-offs from the RF power amplifier at the transmitter, lowering their operational efficiency and linear range of operation. For a linear PA such as class-A, every 3 dB reduction in PAPR moves the PA operating point to double the PA efficiency (PAE). Single-carrier (SC) modes have been used for low PAPR signal designs. With higher order modulation such as 64-QAM or beyond with interpolation and pulse shaping, even these single-carrier modes can have high PAPR. Even SC modes can have PAPR as high as 9 dB with interpolation and pulse shaping. With millimeter wave frequencies such as 60 GHz, PAE becomes significantly worse due to issues such as low maximum supply voltage, decreased transistor gain and lossy interconnects.

When considering PAPR reduction for signals, many aspects need to be considered:

EVM degradation;
Adjacent Channel Leakage Ratio (ACLR);
Requirement for side information;
Impact of analog/RF;
Real-time implementation;
Spectral efficiency; and
Constellation and waveform types supported.

One scheme for PAPR is clipping the signal in the time-domain before amplification. Clipping can reduce PAPR by 2-3 dB but can cause degradation in EVM and cause spectrum growth out-of-band. Other time-domain techniques have been proposed such as partial transmit sequence (PTS) where the signal is partitioned into sub-blocks and each sub-block is multiplied by different phase shifts to minimize the PAPR. The disadvantages of such schemes are the need to partition the transmitter signal, the complexity for searching the optimal phase shifts and the need to send side information (or blind search) at the receiver. Frequency domain approaches have also been considered in the past such as active constellation expansion (ACE), tone injection (TI) and tone reservation (TR). In ACE and TI, the constellations are adjusted to minimize PAPR such that there is no PER loss and no need for side information at the receiver. However, there is still complexity involved in finding the best constellation points, computing the PAPR in the time-domain and iterating this process. The gains for large QAM modulation are also limited in ACE and TI. In TR, a few tones (5-15%) are reserved to help with PAPR reduction. This leads to spectral efficiency loss.

The spectral mask is usually one of the things defined in a band plan for each particular band. It is used to assure that a transmission stays within its channel. An FM radio station, for example, attenuates everything beyond ±75 kHz from the center frequency by a few decibels, and anything beyond ±100 kHz (the channel boundary) by much more. Emissions on further adjacent channels can be reduced to almost zero.

FM broadcast subcarriers are normally required to stay under 75 kHz (and up to 100 kHz if reduced) to comply with the mask. The introduction of in-band on-channel (IBOC) digital radio in the United States has been slowed down by issues concerning the subcarriers it uses—and the corresponding increase in the amount of energy in the sidebands—overstepping the bounds of the spectral mask set forth for FM by the NRSC and enforced by the FCC.

Other types of modulation have different spectral masks for the same purpose. Many digital modulation methods such as coded orthogonal frequency division multiplexing (COFDM) use the electromagnetic spectrum very efficiently, allowing for a very tight spectral mask. This allows placement of broadcast stations or other transmissions on channels right next to each other without interference, allowing for an increase in a band's total capacity. Conversely, it is allowing the U.S. to eliminate TV channels 52 to 69, freeing up 108 MHz (from approximately 700 to 800 MHz) for emergency services and to be auctioned off to the highest bidder, while still retaining (although moving) all existing TV stations. COFDM is a modulation scheme that breaks a broadband channel into many discrete narrow sub channels or subcarriers. The signals are sent at right angles (orthogonal) to each other so they do not interfere with each other.

Figure 5:
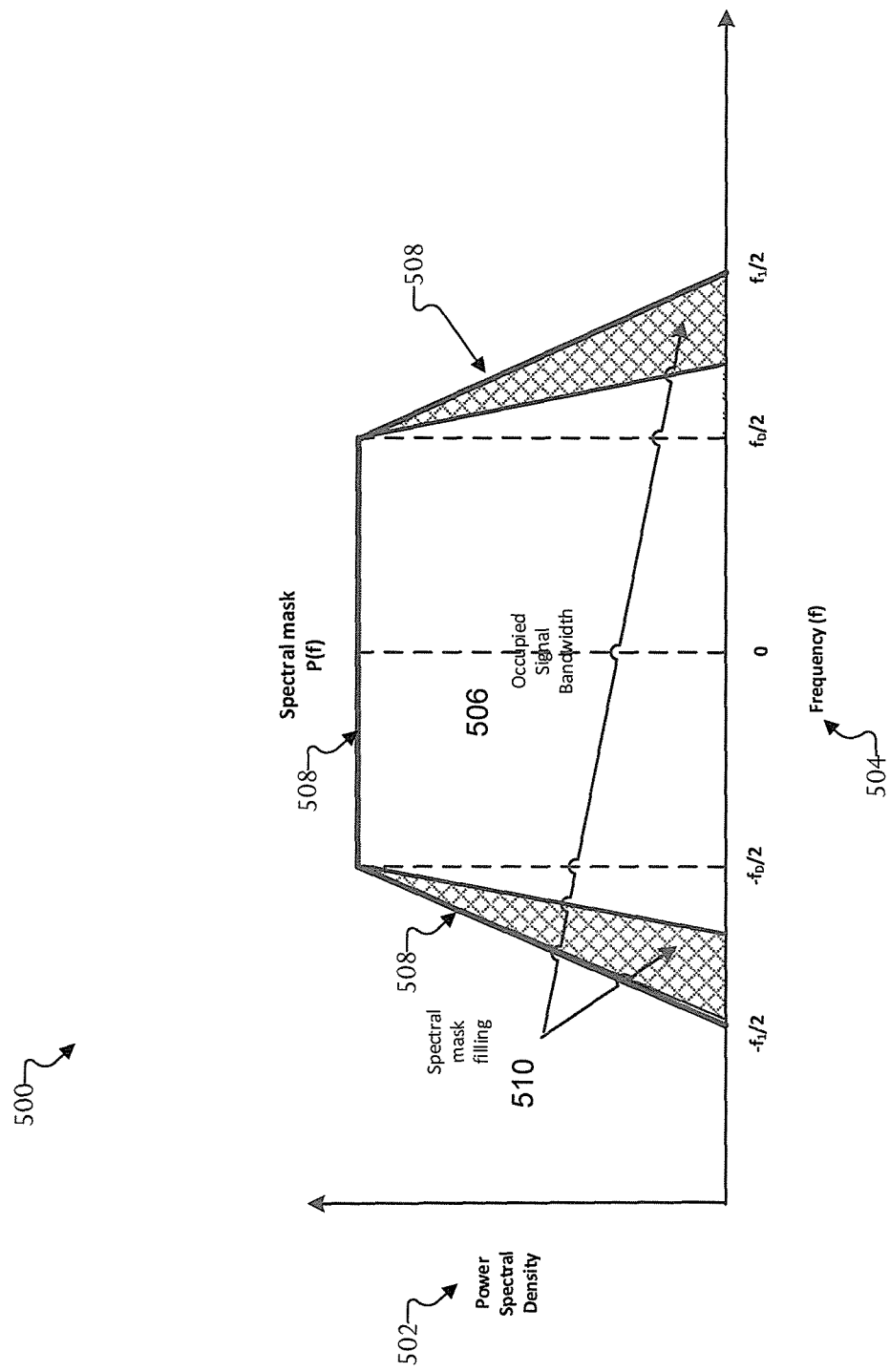
FIG. 5 illustrates spectral mask filling for PAPR reduction in accordance with an embodiment of this disclosure.

FIG. 5 illustrates spectral mask filling for PAPR reduction in accordance with an embodiment of this disclosure. The embodiment of the spectral mask filling illustrated in FIG. 5 is for illustration only. However, spectral mask filling comes in a wide variety of configurations, and FIG. 5 does not limit the scope of this disclosure to any particular implementation of spectral mask filling.

In FIG. 5, a chart 500 provides for a power spectral density 502 in the y-axis and frequency (f) 504 in the x-axis. A spectral mask 508, also known as a channel mask or transmission mask, is a mathematically-defined set of lines applied to the levels of radio (or optical) transmissions. The spectral mask 508 is generally intended to reduce adjacent-channel interference by limiting excessive radiation at frequencies beyond the necessary bandwidth. Attenuation of these spurious emissions is can be done with a band-pass filter, tuned to allow through the correct center frequency of the carrier wave, as well as all necessary sidebands.

In operational terminology, a technique is provided for PAPR reduction referred to as spectral mask filling (SMF). This technique uses any unused available spectrum 510 between the spectral mask and the occupied bandwidth 506 of the signal. Instead of explicitly reserving tones and leading to spectral efficiency loss as in tone reservation, SMF provides a best effort solution to reduce PAPR for no loss in spectral efficiency, depending on the available spectral mask. This scheme is difficult to implement in traditional cellular systems operating below 6 GHz where the spectral mask can be very tight and 45-60 dB ACLR is expected. However, in wireless LAN systems such as IEEE 802.11ad at 60 GHz or future mmWave wireless systems being proposed for 5G, the spectral mask is much more relaxed (~1000× less stringent) due to availability of GHz of bandwidth at these frequencies, lower complexity RF requirements and short range communication. Also, the same spectral mask is applied for both SC and OFDM modes of operation that have very different frequency spectrum shapes. For IEEE 802.11ad as an example, 8-12% of excess spectrum is available under the spectral mask and 1-2% of this energy may be used for PAPR reduction, showing 2-2.5 dB gains over clipping based techniques. In particular, this disclosure makes the following embodiments:

A technique using spectral mask filling (SMF) to reduce PAPR by utilizing any available spectrum between the occupied signal bandwidth and the spectrum mask, without any EVM or spectral efficiency impact. There is no side information to be transmitted, receiver-agnostic and is applicable to both OFDM and SC systems.

A technique of combining the SMF with analog and digital clipping to further reduce the PAPR of the signals

- A technique to generate the SMF sequence for PAPR reduction using the transmit spectral mask
- A feed-forward architecture to implement spectral mask filling that is suitable for real-time implementation. A further reduced complexity version is also developed that has lower latency and can be parallelized with minor performance loss compared to the feed-forward architecture.

For the purpose of evaluating this disclosure, one or more embodiments consider reducing PAPR for an IEEE 802.11ad reference system. In this system, both SC and OFDM modes are supported. For IEEE 802.11ad, the transmit spectrum is 0 dBr within a bandwidth of 1.88 GHz, −17 dBr at a 1.2 GHz offset, −22 dBr at a 2.7 GHz offset and −30 dBr at a 3.06 GHz offset and above. The spectral mask is the same for SC and OFDM modes of operation. The OFDM modes assume a 2.64 GHz sampling frequency with a 512-pt IFFT. For OFDM, 176 guard sub-carriers are set to 0 that can be used for SMF. The SC modes assume a 1.76 GHz sampling frequency, which corresponds to a 3 dB signal occupied bandwidth. The rest of the bandwidth within the mask can be used for SMF. QPSK, 16-QAM and 64-QAM modulations are considered for the purpose of PAPR evaluation.

Figure 6:
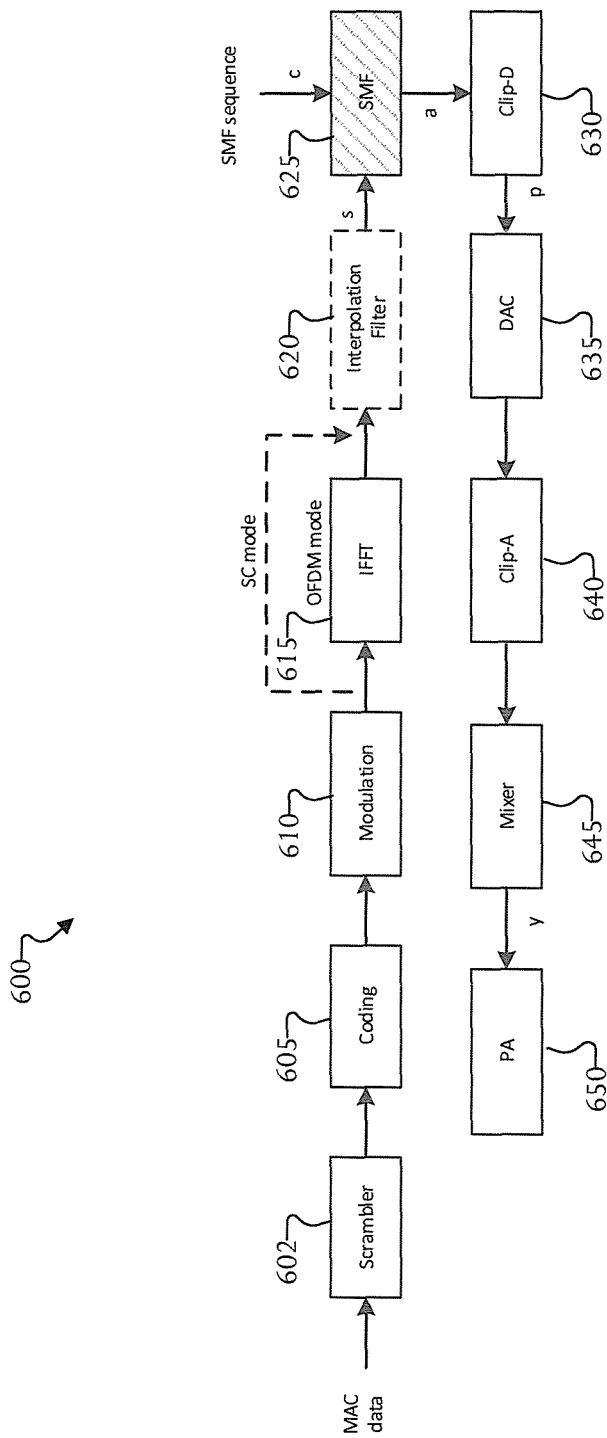
FIG. 6 illustrates an example wireless transmit path with spectral mask filling in accordance with an embodiment of this disclosure.

FIG. 6 illustrates an example wireless transmit path with spectral mask filling in accordance with an embodiment of this disclosure. The embodiment of the block diagram illustrated in FIG. 6 is for illustration only. However, spectral mask filling comes in a wide variety of configurations, and FIG. 6 does not limit the scope of this disclosure to any particular implementation of spectral mask filling.

In FIG. 6, a transmit path 600 may be described as being implemented in a UE (such as UE 116). The transmit path 600 includes a scrambler block 602, a channel coding block 605, a modulation block 610, an Inverse Fast Fourier Transform (IFFT) block 615, an interpolation filter 620, a spectral mask filler algorithm 625, clip-d block 630, digital-to-analog converter 635, clip-a block 640, mixer block 645, and power amplifier (PA) 650.

In operational terminology, in the transmit path 600, the scrambler block 602 receives MAC data and transposes or inverts the MAC data or otherwise encodes a message at the transmitter to make the message unintelligible at a receiver not equipped with an appropriately set descrambling device. It also ensures the message information is sufficiently random to avoid spectral lines. The channel coding block 605 receives a set of information bits, applies coding (such as a low-density parity check (LDPC) coding). The modulation block 610 modulates the input bits (such as with Quadrature Phase Shift Keying (QPSK) or Quadrature Amplitude Modulation (QAM)) to generate a sequence of frequency-domain modulation symbols. The IFFT block 415 performs an IFFT operation to generate time-domain output signals.

In one or more embodiments, both SC and OFDM modes are supported. The time-domain signal is first interpolated using the interpolation filter 620. The spectral mask-filling algorithm 625 is then applied on the signal "s" to provide a reduced PAPR signal "a". The signal is then clipped digitally by clip-d block 630 and then sent to the DAC 635 after which there is another stage of analog clipping by clip-a block 640. An ideal mixer at mixer block 645 for the purpose of PAPR is assumed and the signal is sent to the PA 650, where the true PAPR is measured.

In an embodiment, two levels of clipping are applied. Clipping is first applied in the digital domain at clip-d block 630 to provide a better quality signal to the DAC for given number of bits. Digital clipping also provides better control on the clipping threshold. When the signal passes through the DAC 635, the PAPR may increase further due to additional interpolation by the DAC 635. Hence, analog clipping at clip-a 640 can be added to keep the PAPR within a target requirement.

The interpolation filter 620 is optional but care should be taken to ensure any filtering done on the signal does not alias the SMF signal energy in-band. The interpolation helps reduce the side-band leakage in-band and also, since it causes a PAPR increase, it is best to reduce the PAPR after the signal has been interpolated. The PAPR is calculated for the signal y at the input of the PA 650. Note that y can be interpolated by 4× relative to s to approximate the PAPR of the signal at the PA 650 input. An example embodiment can provide a 2× interpolation before the DAC 635 to help with aliasing and an additional 2× at the DAC 635 when the signal is converted into an analog signal. An example embodiment can provide to N be the number of samples for one OFDM symbol or SC block in the time-domain after interpolation. Then, the PAPR is calculated as:

$$PAPR = \frac{\max_{0 \le n \le N-1} |y_n|^2}{E[|y_n|^2]} \quad (1)$$

Figure 7:
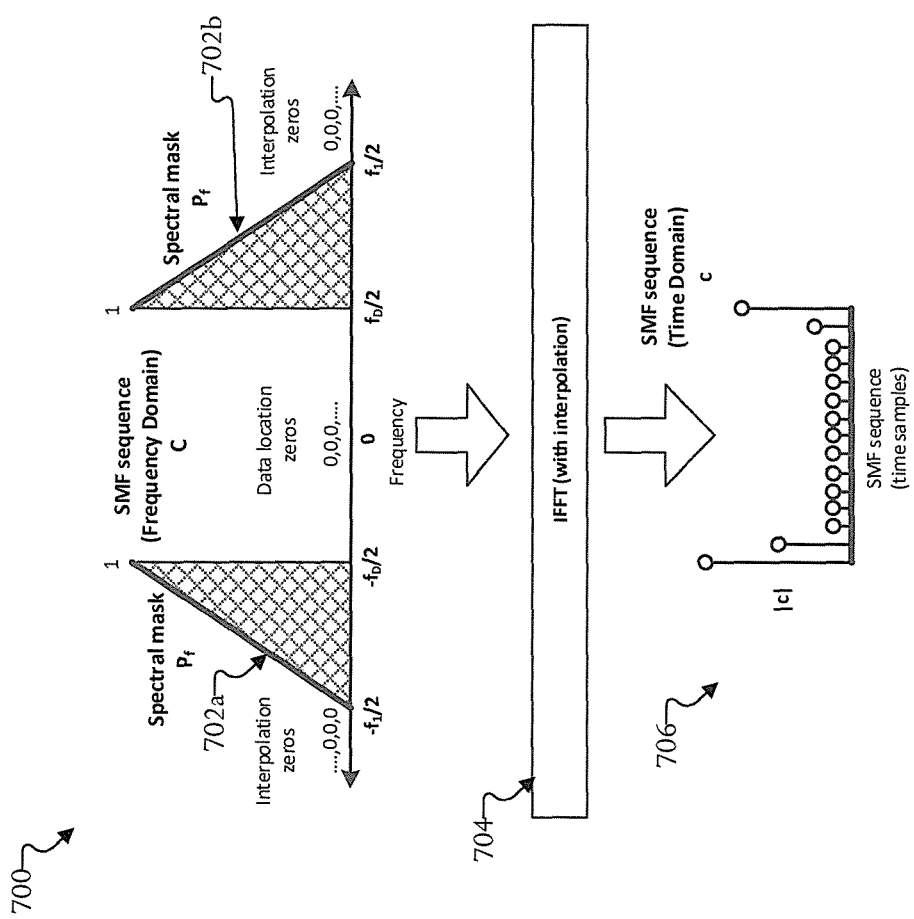
FIG. 7 illustrates spectral mask filling sequence in the time domain in accordance with an embodiment of this disclosure.

FIG. 7 illustrates spectral mask filling sequence 700 in the time domain in accordance with an embodiment of this disclosure. The embodiment of the spectral mask filling sequence 700 illustrated in FIG. 7 is for illustration only. However, spectral mask filling sequences comes in a wide variety of configurations, and FIG. 7 does not limit the scope of this disclosure to any particular implementation of a spectral mask filling sequence.

One or more embodiments of this disclosure provide a method to generate SMF sequence "c". The spectral mask filling sequence 700 is generated by using the unused available spectrum between the mask 702a-b and the occupied signal spectrum and converting it into a time domain sequence 706 using an IFFT 704. The spectral mask filling algorithm uses this time-domain sequence and aligns the sequence to the peak of the signal using circular shifts and cancels the sequence. Since circular shifts of a sequence do not change its spectral content, peaks of the signal can be cancelled without affecting the in-band signal.

In one embodiment, an ideal SMF sequence 700 is an impulse in time domain so that the impact on other samples is minimized. A desirable property of SMF sequence is to have a strong unique peak. The procedure for SMF sequence generation is shown in FIG. 7. Let $f_S$ be the sampling frequency at the DAC and $f_D$ be occupied signal bandwidth. Let $f_1$ be the maximum frequency considered under the mask for spectral mask filling where $f_D < f_1 \le f_S$. Let A(f) be the normalized amplitude of the corresponding power spectral density mask P(f). The SMF sequence is constructed in the frequency domain C(f) as follows:

$$C(f) = \begin{cases} 0 & f \le f_D \\ A(f) & f_D < f \le f_1 \\ 0 & f_1 < f \le f_S \end{cases} \quad (2)$$

The sequence C(f) is sampled as $C=[C_0, C_1 \ldots C_{N-1}]^T$ and is pre-computed and stored in the time-domain with a N-point IFFT as $c=[c_0, c_1 \ldots c_{N-1}]^T$. SC and OFDM modes can have different SMF sequences under the same spectral mask based on their occupied bandwidth and spectrum shape.

Figure 8:
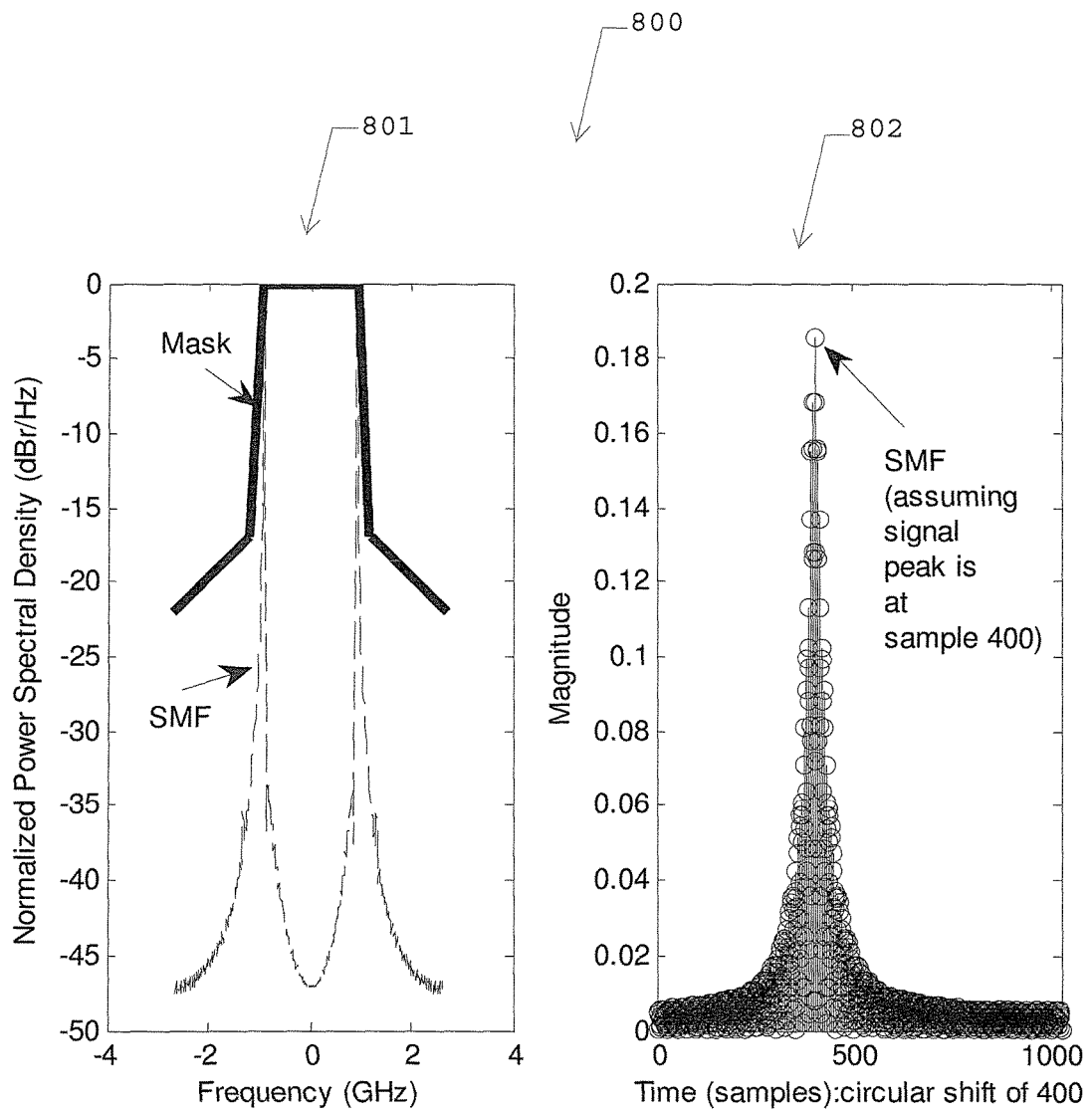
FIG. 8 provides illustrations of aligning a SMF sequence to peak of signal for PAPR reduction in the time domain in accordance with an embodiment of this disclosure.

FIG. 8 provides illustrations 800 of aligning a SMF sequence to peak of signal for PAPR reduction in the time domain in accordance with an embodiment of this disclosure. The embodiment of aligning a SMF sequence illustrated in FIG. 8 is for illustration only. However, aligning a SMF sequence comes in a wide variety of configurations, and FIG. 8 does not limit the scope of this disclosure to any particular implementation of aligning a SMF sequence.

In illustration 801, a mask and spectral filling mask are shown in a frequency domain. In illustration 802, a spectral frequency mask is shown in a time domain. In illustration 802, an example is shown with a circular shift of 400. In an example embodiment, the SMF algorithm does not use any explicitly reserved tones but uses any available spectrum under the mask. If A(f) is derived from the spectral mask as real values (magnitude only), the peak of "c" occurs at the first sample $c_0$. The algorithm aligns the SMF sequence peak to the peak of signal and reduces it iteratively. For example, if the peak of the signal "s" is at sample i=400 and the peak of "c" occurs at the first sample $c_0$, the SMF sequence "c" is circularly shifted by i=400, denoted as $c^i$ where $c^i \triangleq [c_i, c_{i+1} \ldots c_{N-1} c_0 \ldots c_{i-1}]^T$, to align the SMF sequence to the signal peak. Chart 800 shows the SMF sequence generated for OFDM using the IEEE 802.11ad spectral mask using real values, which is circularly shifted by 400 samples. The SMF sequence is then scaled appropriately by a predetermined fixed scaling factor $\alpha$ to reduce the peak. The value $\alpha$ should be chosen to ensure the SMF energy is limited to the spectral mask and that the SMF sequence addition does not increase PAPR by contributing to other peaks in the signal while cancelling the current peak. Simulations show that the algorithm is relatively insensitive to a and it can be implemented as a simple constant such as a power of two.

Figure 9:
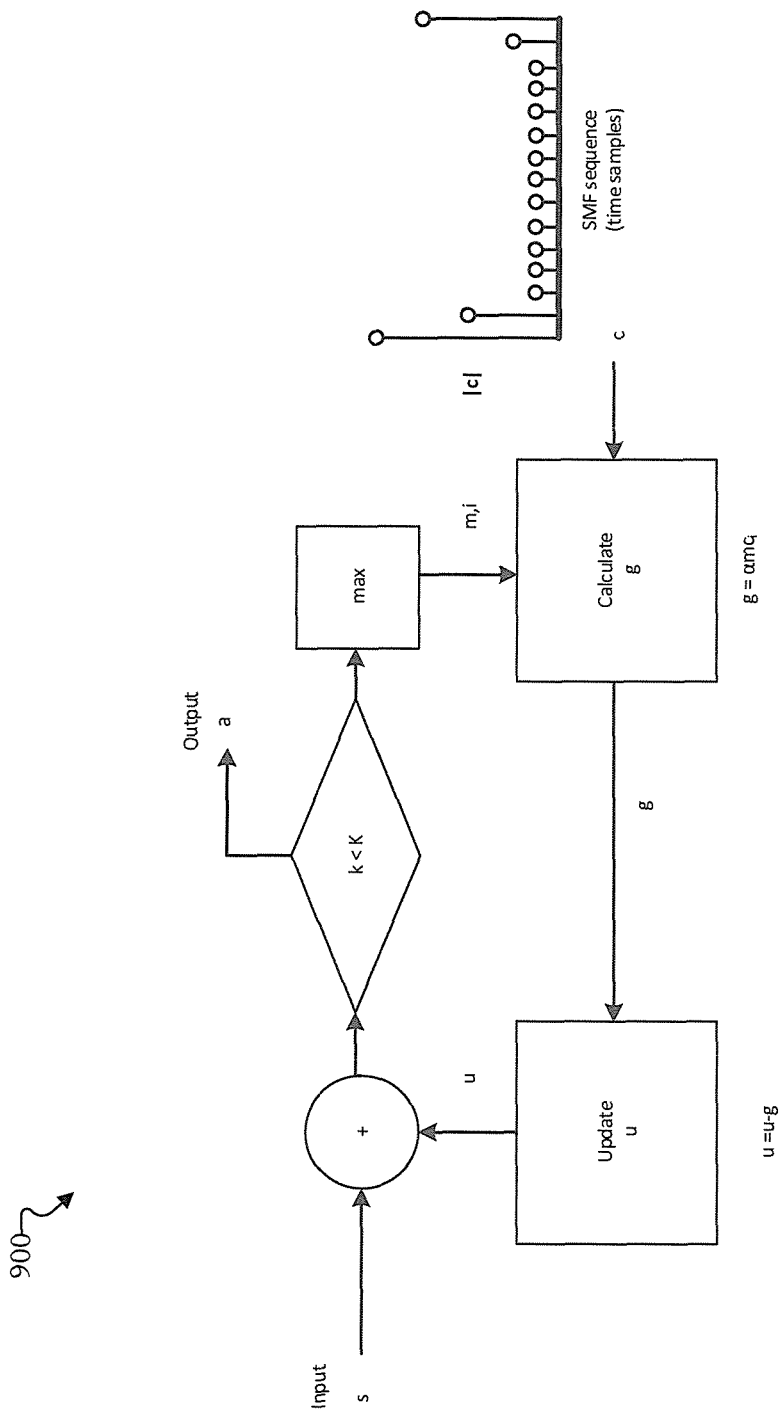
FIG. 9 illustrates an iterative SMF algorithm for PAPR reduction in the time domain in accordance with an embodiment of this disclosure.

FIG. 9 illustrates an iterative SMF algorithm 900 for PAPR reduction in the time domain in accordance with an embodiment of this disclosure. The embodiment of the SMF algorithm 900 illustrated in FIG. 9 is for illustration only. However, iterative SMF algorithms come in a wide variety of configurations, and FIG. 9 does not limit the scope of this disclosure to any particular implementation of an iterative SMF algorithm.

In an embodiment, the term K is the number of iterations that are performed for SMF. The term "g" can be the scaled version of $c^i$ that is to be added to signal "s" to cancel a peak at iteration "k" and $u_K$ is the sum of all scaled SMF sequences until iteration "k". The term $u_0$ be initialized to all zeros. The term "m" is the peak of the complex sample at every iteration and "i" is the index of the peak. The algorithm process is shown in FIG. 9 and is described as follows:

$u_0 = [00 \ldots 0]^T$ for $k=1:K$ $\{m = \max(s+u_{k-1})$ $i = \arg \max(s+u_{k-1})$ $g = \alpha m c^i$ $u_k = u_{k-1} - g\}$ end $a = s + u_K$ (3)

The PAPR reduced signal "a" is the sum of "s" and all the scaled shifted sequences $u_K$. The computations involved are finding a complex maximum and its index, complex multiplication and addition. The addition of this sequence can use increasing the signal energy by 1.5-2% for 20 iterations.

Figure 10:
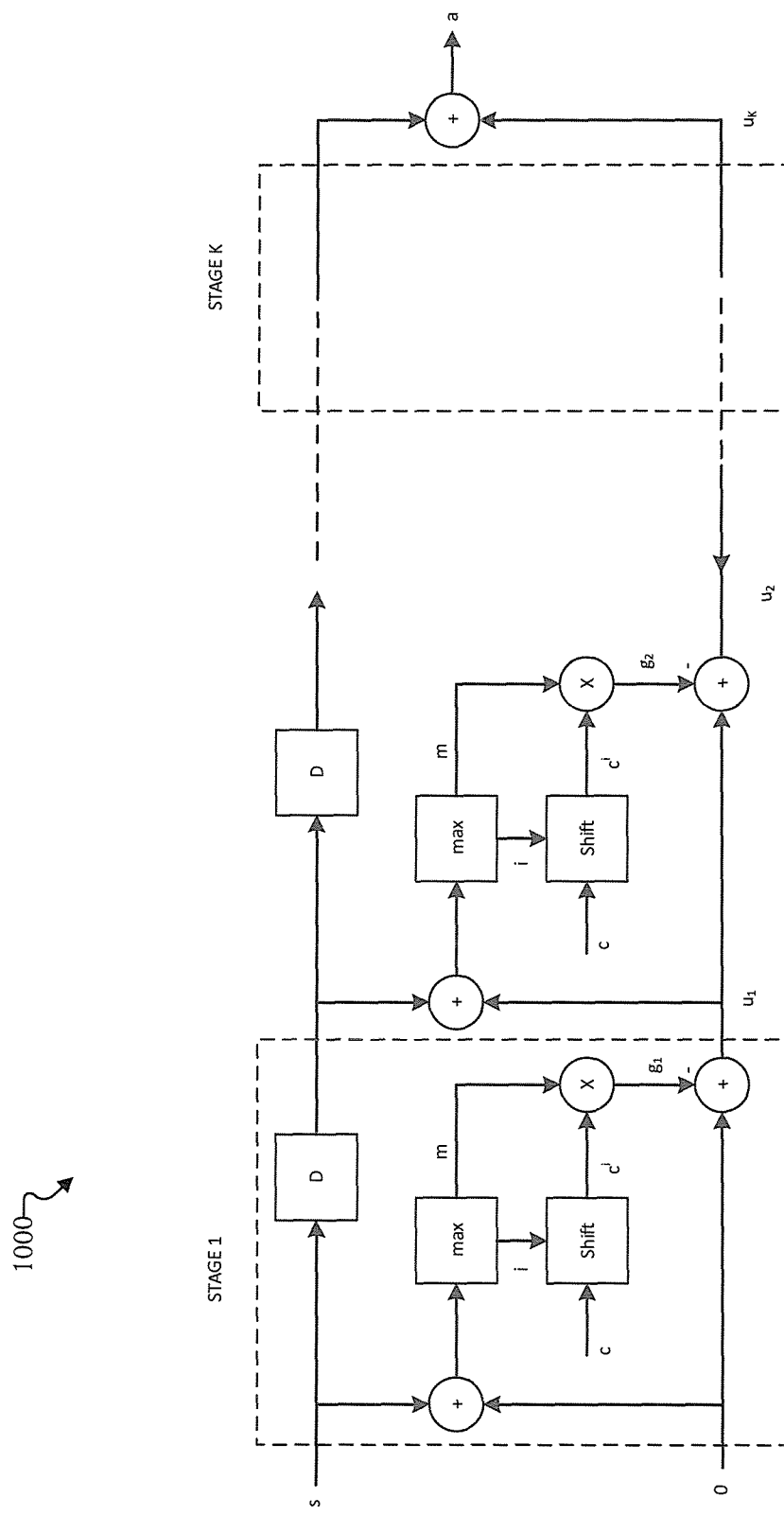
FIG. 10 illustrates a feed-forward architecture for SMF implementation in the time domain in accordance with an embodiment of this disclosure.

FIG. 10 illustrates a feed-forward architecture 1000 for SMF implementation in the time domain in accordance with an embodiment of this disclosure. The embodiment of the feed-forward architecture 1000 illustrated in FIG. 10 is for illustration only. However, feed-forward architectures come in a wide variety of configurations, and FIG. 10 does not limit the scope of this disclosure to any particular implementation of feed-forward architecture.

In FIG. 10, a real-time implementation for the feed-forward architecture 1000 can require significant buffering and very high speed iterations are needed in order to implement the algorithm in a feedback loop. An option to improve real-time implementation at the expense of additional hardware is to have a feed-forward design by loop unrolling. This is equivalent mathematically to iterative SMF algorithm and has K stages. Each stage is trying to cancel a peak of the signal.

Figure 11:
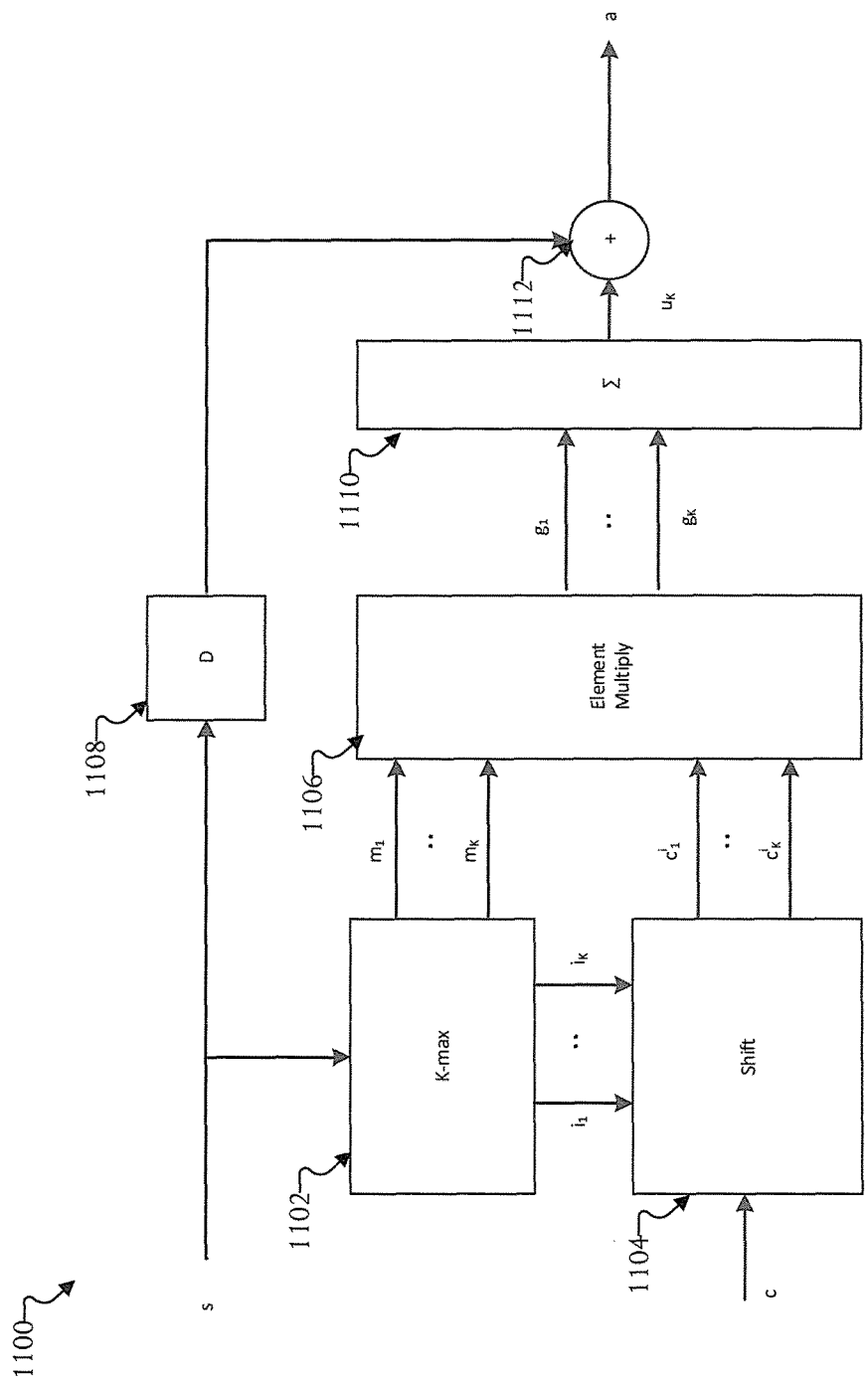
FIG. 11 illustrates reduced complexity architecture for SMF in accordance with an embodiment of this disclosure.

FIG. 11 illustrates reduced complexity architecture 1100 for SMF in accordance with an embodiment of this disclosure. The embodiment of the reduced complexity architecture 1100 illustrated in FIG. 11 is for illustration only. However, the reduced complexity architecture comes in a wide variety of configurations, and FIG. 11 does not limit the scope of this disclosure to any particular implementation of the reduced complexity architecture.

In FIG. 11, the architecture 1100 can include K-max block 1102, shift block 1104, element multiply block 1106, D block 1108, Σ block 1110, and adder block 1112. In operational terminology, the complexity of the SMF algorithm can be further reduced if it is assumed that the peaks of the signal "s" do not change when the scaled SMF sequences are added, which can be true if the SMF sequence is an impulse. As the number of iterations is increased, the probability that the signal peaks did not change, $\Pr(\max_k (s) = \max(s+u_{(k-1)}))$, reduces and the reduced complexity algorithm becomes less precise with increased number of iterations.

In an embodiment, an operator $\max_k (s)$, which returns the $k^{th}$ maximum of the complex signal "s," can be defined in block 1102. The term $m_K = [m_0, m_1 \ldots m_{(K-1)}]^T$ can be the top K peaks in signal "s". The term $c_K^i$ can be a matrix of size N×K whose columns are the K shifted SMF sequences in block 1104 corresponding to $m_K$. Thus, all the scaled sequences for cancelling the K peaks, $g_K$, can be computed in parallel. The term $g_K$ is a matrix of size N×K whose sum along the rows of the matrix generates the sequence $u_K$ of length N. The algorithm process is shown in FIG. 11 and is described as follows:

$$m_K = \max_K (s)$$
$$i_K = \arg\max_K (s)$$
$$g_K = \alpha c_K^i \text{diag}(m_K)$$
$$u_K = -\sum_{k=1}^{K} g_K$$
$$a = s + u_K$$

(4)

In this example, the latency is reduced by O(K) and K max computations get replaced by a single K-max computation.

As illustrated in this disclosure, one or more embodiments referred to as spectral mask filling (SMF) provide for PAPR reduction in wireless LAN systems using any available spectrum between the occupied signal bandwidth and the spectral mask. This technique can be applied for both OFDM as well as SC systems where PAPR can be an issue due to pulse shaping and large QAM. The technique shows 2-2.5 dB gains in PAPR for a reference IEEE 802.11ad system compared to clipping without any compromise on EVM, spectral efficiency or need for side information to the receiver. A reduced complexity implementation scheme is shown that reduces the latency and computational complexity by O(K) and shows 0.5-2 dB performance gains over clipping. Some considerations for applying this technique is that the PAPR gains are dependent on the availability of a relaxed spectral mask and on the interpolation and pulse shaping filters used, if any. Any filters used could be carefully designed so that SMF addition does not alias in-band. In one embodiment, the system also assumes ideal RF/analog and does not model any PAPR changes due to the mixers or other filters in the RF chain.

Figure 12:
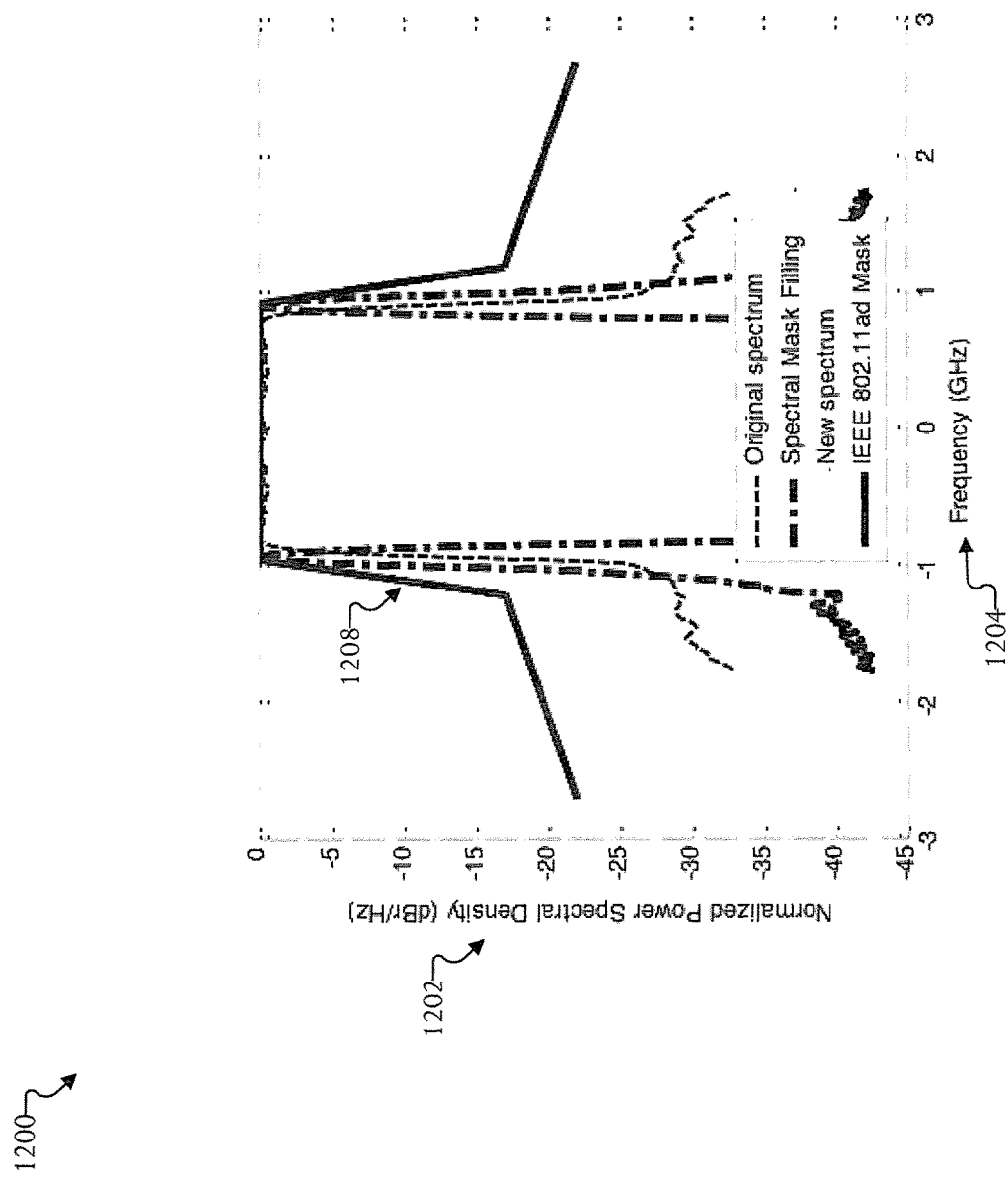
FIG. 12 illustrates spectral mask filling using other tones available under spectral mask in accordance with an embodiment of this disclosure.

FIG. 12 illustrates spectral mask filling using other tones available under spectral mask in accordance with an embodiment of this disclosure. The embodiment of the spectral mask filling illustrated in FIG. 12 is for illustration only. However, spectral mask filling comes in a wide variety of configurations, and FIG. 12 does not limit the scope of this disclosure to any particular implementation of spectral mask filling.

In FIG. 12, a chart 1200 provides for a power spectral density 1202 in the y-axis and frequency (f) 1204 in the x-axis. A spectral mask 1208, also known as a channel mask or transmission mask, is a mathematically-defined set of lines applied to the levels of radio (or optical) transmissions. The spectral mask 1208 is generally intended to reduce adjacent-channel interference by limiting excessive radiation at frequencies beyond the necessary bandwidth. As can be seen, the addition of the SMF sequence does not violate the spectral mask 1208 and only marginally expands the spectrum of the transmitted RF signal.

One or more embodiments provides for the use of other tones available under spectral mask. Other unused in-band tones available under the spectral mask can be used for spectral mask filling. For example, IEEE 802.11ad allows three tones for DC tone nulling. However, a single tone may be adequate for DC nulling depending on the RF design. In this example, the unused tones within the mask B(f), such as additional DC tones, can also be used for spectral mask filling sequence generation.

$$C(f) = \begin{cases} B(f) & f \le f_D \\ A(f) & f_D < f \le f_1 \\ 0 & f_1 < f \le f_S \end{cases} \quad (5)$$

Figure 13A:
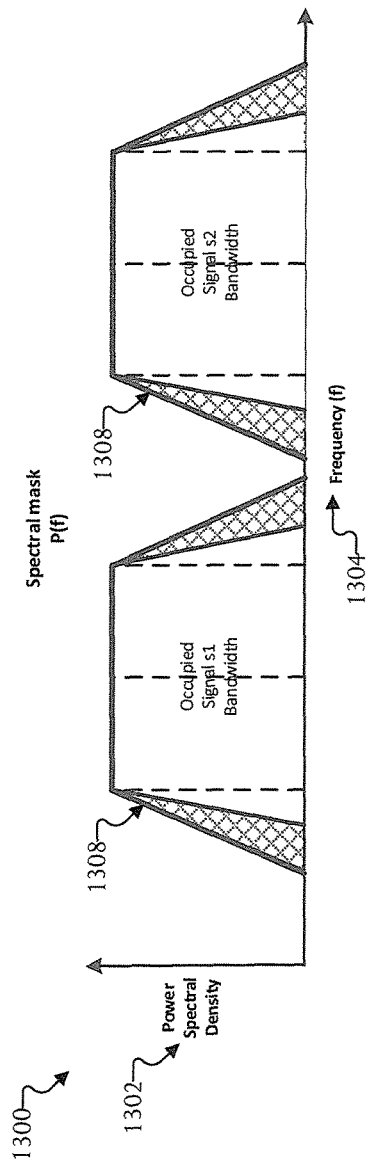
FIGS. 13A and 13B illustrate spectral mask filling for PAPR reduction with carrier aggregation in accordance with an embodiment of this disclosure.
Figure 13B:
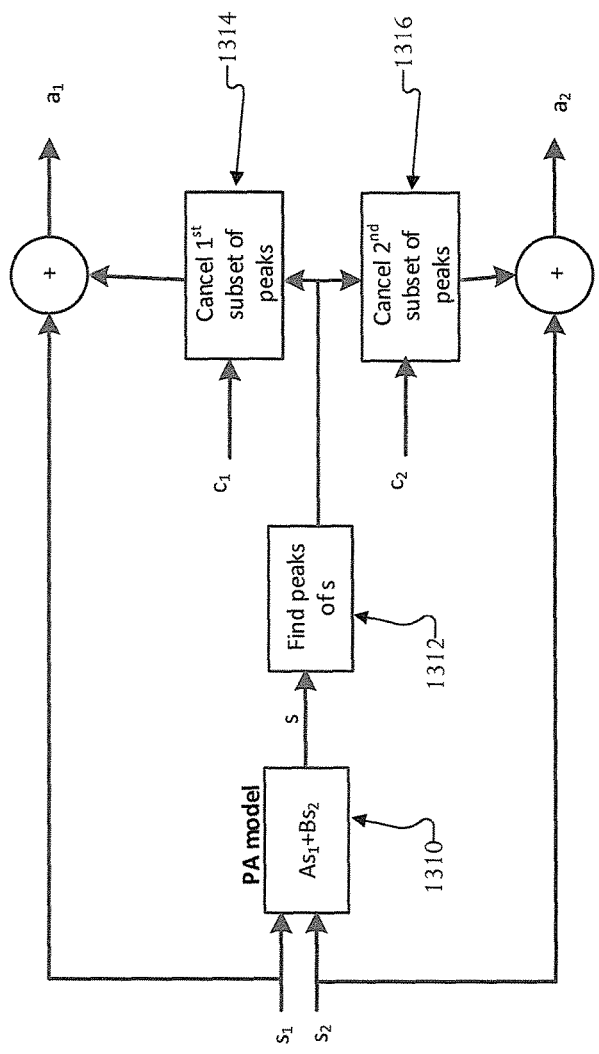

FIGS. 13A and 13B illustrate spectral mask filling for PAPR reduction with carrier aggregation in accordance with an embodiment of this disclosure. The embodiment of the spectral mask filling illustrated in FIG. 13 is for illustration only. However, spectral mask filling comes in a wide variety of configurations, and FIG. 13 does not limit the scope of this disclosure to any particular implementation of spectral mask filling.

In FIG. 13A, a chart 1300 provides for a power spectral density 1302 in the y-axis and frequency (f) 1304 in the x-axis for carrier aggregation. A spectral mask 1308, also known as a channel mask or transmission mask, is a mathematically-defined set of lines applied to the levels of radio (or optical) transmissions. The spectral mask 1308 is generally intended to reduce adjacent-channel interference by limiting excessive radiation at frequencies beyond the necessary bandwidth.

In FIG. 13B, one or more embodiments provides for carrier aggregation/channel bonding. In some example embodiments, signals from multiple frequency bands can be mixed together after the DAC and before entering the power amplifier (PA). In such examples, the SMF algorithm can be modified instead of optimizing PAPR for each band individually. If the signals are $s_1$ and $s_2$ and the signals get mixed in block 1310 before the PA as $s = A\,s_1 + B\,s_2$, where A and B are pre-determined based on the mixing done after the DAC, then instead of optimizing PAPR individually, the PA model is first constructed in baseband and the peaks for the signal "s" are searched in block 1312.

If each signal has its own spectral mask sequence $c_1$ and $c_2$, depending on the DAC bandwidth, $c_1$ and $c_2$ can operate in parallel to cancel the peaks in signal "s" by each picking a subset of peaks. In an example embodiment, $c_1$ can cancel a subset of peaks in block 1314 and $c_2$ in block 1316. For example, $c_1$ can operate on cancelling odd peaks of "s" while $c_2$ can operate on cancelling even peaks of "s". The output of the SMF algorithm can be then added to the individual signals and sent to the DACs.

Figure 14:
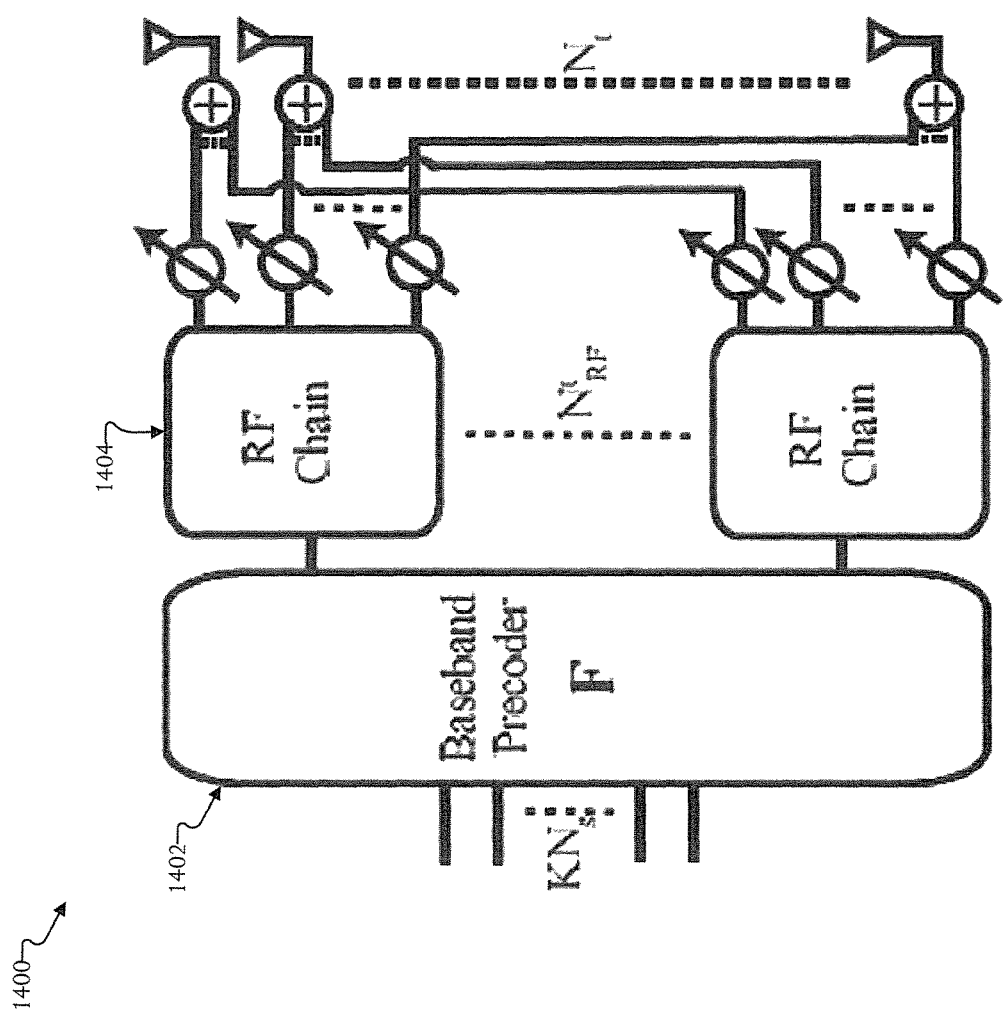
FIG. 14 illustrates architecture for SMF in a MIMO system in accordance with an embodiment of this disclosure.

FIG. 14 illustrates architecture 1400 for SMF in a MIMO system in accordance with an embodiment of this disclosure. The embodiment of the reduced complexity architecture 1400 illustrated in FIG. 14 is for illustration only. However, the reduced complexity architecture comes in a wide variety of configurations, and FIG. 14 does not limit the scope of this disclosure to any particular implementation of the reduced complexity architecture.

In operational terminology, this embodiment can be similarly applied for PAPR reduction in MIMO systems in general directly where there are separate RF chains (separate PAs) for each MIMO stream. In this example, the SMF algorithm is applied independently on each stream with the appropriate scaling levels relative to the signal power applied for each stream. In the specific case where hybrid precoding (both digital and analog precoding) is used to minimize the number of RF chains, the signals can combine before the PA invalidating the PAPR reduction optimization. A similar procedure to that shown in FIG. 13B can be applied in this example.

In FIG. 14, architecture 1400 shows a fully interconnected network where there is a baseband precoder ($F_{BB}$) 1402 followed by a RF precoder ($F_{RF}$) 1404 where signals are added in the RF before going to the PA. Since the knowledge of the RF precoder is known a priori, the SMF algorithm can jointly optimize signals going into the PA rather than optimizing each signal on an individual basis.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment for wireless communication with at least one base station comprising:
   a transceiver configured to communicate with the at least one base station by transmitting radio frequency (RF) signals to the at least one base station and by receiving RF signals from the at least one base station;

processing circuitry configured to:
  identify an occupied signal bandwidth of the RF signals;
  identify a spectral mask for the occupied signal bandwidth;
  identify an unused available spectrum between the occupied signal bandwidth and the spectral mask; and
  modulate a spectral mask filling (SMF) signal in the unused available spectrum, the SMF signal configured to reduce a peak-to-average power ratio of the RF signals; and
a plurality of RF chains, each RF chain comprising an RF stream, wherein the processing circuitry is further configured to modulate the SMF signal in the unused available spectrum independently on each of the RF streams with appropriate scaling levels relative to a signal power applied for each of the RF streams.

2. The user equipment of claim 1, wherein modulating the SMF signal in the unused available spectrum further comprises the processing circuitry configured to modulate the SMF signal in a time domain, where the SMF signal is derived using an SMF sequence in a frequency domain.

3. The user equipment of claim 2, wherein the SMF sequence in the frequency domain is defined as:

$$C(f) = \begin{cases} 0 & f \leq f_D \\ A(f) & f_D < f \leq f_1 \\ 0 & f_1 < f \leq f_S \end{cases},$$

where $f_S$ is a sampling frequency at a digital-to-analog converter, $f_D$ is the occupied signal bandwidth, $f_1$ is a maximum frequency under the spectral mask, $A(f)$ is a normalized amplitude of a corresponding power spectral density mask, and $C(f)$ is the SMF sequence in a frequency domain.

4. The user equipment of claim 2, wherein the SMF sequence in the frequency domain is defined as:

$$C(f) = \begin{cases} B(f) & f \leq f_D \\ A(f) & f_D < f \leq f_1 \\ 0 & f_1 < f \leq f_S \end{cases}$$

where $f_S$ is a sampling frequency at a digital-to-analog converter, $f_D$ is the occupied signal bandwidth, $f_1$ is a maximum frequency under the spectral mask, $A(f)$ is a normalized amplitude of a corresponding power spectral density mask, $B(f)$ is unused tones within the occupied signal bandwidth, and $C(f)$ is the SMF sequence in a frequency domain.

5. The user equipment of claim 1, wherein modulating the SMF signal in the unused available spectrum further comprises the processing circuitry configured to align a peak of the RF signals to a peak of the SMF signal by circularly shifting an SMF sequence in a frequency domain.

6. The user equipment of claim 5, wherein circularly shifting the SMF sequence further comprises the processing circuitry configured to iteratively circularly shift the SMF sequence to cancel a plurality of peaks of the RF signals.

7. The user equipment of claim 6, wherein iteratively circularly shifting the SMF sequence to cancel the plurality of peaks of the RF signals further comprises the processing circuitry configured in a feed forward architecture.

8. The user equipment of claim 6, wherein the processing circuitry is further configured to approximate a plurality of peaks of the RF signals before canceling the plurality of peaks of the RF signals, wherein the approximation comprises a calculation with an assumption that the plurality of peaks of the RF signals do not change with each iteration of circular shifting.

9. An apparatus comprising:
a memory element configured to store radio frequency (RF) signals;
a controller coupled to the memory element, the controller configured to:
  identify an occupied signal bandwidth of the RF signals;
  identify a spectral mask for the occupied signal bandwidth
  identify an unused available spectrum between the occupied signal bandwidth and the spectral mask; and
  modulate a spectral mask filling (SMF) signal in the unused available spectrum, the SMF signal configured to reduce a peak-to-average power ratio of the RF signals; and
a plurality of RF chains, each RF chain comprising an RF stream, wherein the controller is further configured to modulate the SMF signal in the unused available spectrum independently on each of the RF streams with appropriate scaling levels relative to a signal power applied for each of the RF streams.

10. The apparatus of claim 9, wherein modulating the SMF signal in the unused available spectrum further comprises the controller configured to modulate the SMF signal in a time domain, where the SMF signal is derived using an SMF sequence in a frequency domain.

11. The apparatus of claim 10, wherein the SMF sequence in the frequency domain is defined as:

$$C(f) = \begin{cases} 0 & f \leq f_D \\ A(f) & f_D < f \leq f_1 \\ 0 & f_1 < f \leq f_S \end{cases},$$

where $f_S$ is a sampling frequency at a digital-to-analog converter, $f_D$ is the occupied signal bandwidth, $f_1$ is a maximum frequency under the spectral mask, $A(f)$ is a normalized amplitude of a corresponding power spectral density mask, and $C(f)$ is the SMF sequence in the frequency domain.

12. The apparatus of claim 10, wherein the SMF sequence in the frequency domain is defined as:

$$C(f) = \begin{cases} B(f) & f \leq f_D \\ A(f) & f_D < f \leq f_1 \\ 0 & f_1 < f \leq f_S \end{cases}$$

where $f_S$ is a sampling frequency at a digital-to-analog converter, $f_D$ is the occupied signal bandwidth, $f_1$ is a maximum frequency under the spectral mask, $A(f)$ is a normalized amplitude of a corresponding power spectral density mask, $B(f)$ is unused tones within the occupied signal bandwidth, and $C(f)$ is the SMF sequence in the frequency domain.

13. The apparatus of claim 9, wherein modulating the SMF signal in the unused available spectrum further comprises the controller configured to align a peak of the RF signals to a peak of the SMF signal by circularly shifting an SMF sequence in a frequency domain.

14. The apparatus of claim 13, wherein circularly shifting the SMF sequence further comprises the controller configured to iteratively circularly shift the SMF sequence to cancel a plurality of peaks of the RF signals.

15. The apparatus of claim 14, wherein iteratively circularly shifting the SMF sequence to cancel the plurality of peaks of the RF signals further comprises the controller configured in a feed forward architecture.

16. The apparatus of claim 15, wherein the controller is further configured to approximate a plurality of peaks of the RF signals before canceling the plurality of peaks of the RF Signals, wherein the approximation comprises a calculation with an assumption that the plurality of peaks of the RF signals do not change with each iteration of circular shifting.

17. A method for peak to average peak ratio reduction, the method comprising:

identifying an occupied signal bandwidth of radio frequency (RF) signals;

identifying a spectral mask for the occupied signal bandwidth;

identifying an unused available spectrum between the occupied signal bandwidth and the spectral mask;

modulating a spectral mask filling (SMF) signal in the unused available spectrum, the SMF signal configured to reduce a peak-to-average power ratio of the RF signals; and modulating the SMF signal in the unused available spectrum independently on each of a plurality of RF streams with appropriate scaling levels relative to a signal power applied for each of the RF streams, where each of a plurality of RF chains comprises a respective on of the plurality of RF streams.

18. The method of claim 17, wherein modulating the SMF signal in the unused available spectrum further comprises modulating the SMF signal in a time domain, where the SMF signal is derived using an SMF sequence in a frequency domain.

* * * * *